(12) United States Patent
Remein

(10) Patent No.: US 6,477,142 B1
(45) Date of Patent: Nov. 5, 2002

(54) METHOD FOR USING MORE BANDWIDTH IN A UNI-DIRECTIONAL PATH-SWITCHED SONET RING

(75) Inventor: Duane R. Remein, Raleigh, NC (US)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/185,807

(22) Filed: Nov. 4, 1998

(51) Int. Cl.$^7$ ................................................. H04J 3/00
(52) U.S. Cl. ........................................................ 370/222
(58) Field of Search ................................. 370/442, 347, 370/535, 537, 216, 222, 223, 224, 228, 227, 249, 248, 337, 450, 460, 461, 458, 459, 376, 372, 373, 374, 367, 480, 403, 404, 405, 406, 907, 906, 908; 359/128, 134, 139, 341, 119, 110

(56) References Cited

U.S. PATENT DOCUMENTS

| | | | |
|---|---|---|---|
| 5,282,200 A | 1/1994 | Dempsey et al. | 370/85.12 |
| 5,412,652 A | 5/1995 | Lu | 370/85.12 |
| 5,469,428 A | 11/1995 | Tokura et al. | 370/161 |
| 5,491,686 A | 2/1996 | Sato | 370/16.1 |
| 5,515,367 A | 5/1996 | Cox, Jr. et al. | 370/60.1 |
| 5,546,403 A | 8/1996 | Yamamoto et al. | 371/120.5 |
| 5,546,542 A | 8/1996 | Cosares et al. | 395/200.21 |
| 6,202,082 B1 * | 3/2001 | Tomizawa et al. | 370/389 |
| 6,272,154 B1 * | 8/2001 | Bala et al. | 370/535 |
| 6,292,485 B1 * | 9/2001 | Trotta et al. | 370/397 |

* cited by examiner

Primary Examiner—Dang Ton
(74) Attorney, Agent, or Firm—Ware, Fressola, Van Der Sluys & Adolphson LLP

(57) ABSTRACT

A method for increasing the bandwidth of a uni-directional path switched SONET ring network by sacrificing protection of the information carried on the ring network. The method alters the way in which information is added into the ring at a node and how its is dropped at other nodes on the ring. Information added into the ring is added into only one of the two redundant paths of the SONET ring network, leaving the remaining path available to carry different, non-redundant information. Information dropped from the ring is also re-transmitted to down-stream nodes on the ring.

4 Claims, 3 Drawing Sheets

METHOD FOR USING MORE BANDWIDTH IN A UNI-DIRECTIONAL PATH-SWITCHED SONET RING

BACKGROUND OF THE INVENTION

1. Technical Field

The present invention relates to the use of bandwidth in a Synchronous Optical Network (SONET) ring. More particularly, the present invention is a method, for use in transmitting broadcast traffic (point to multi-point), of trading protection bandwidth in a uni-directional path-switched (UPS) SONET ring for un-protected usable bandwidth.

2. Description of Related Art

SONET is the ANSI standard for advanced fiber optic transmission. Under SONET, network elements can communicate in a ring by passing information frames. In these rings entire communication streams are collected and routed within a level one or higher synchronous transport signal (STS-1 or higher) frame, instead of being de-multiplexed and multiplexed each time a signal is added or dropped. Besides STS-1 signals, multiples of these communications signals may be synchronously multiplexed into higher rate STS-N signals. STS-N signals are then converted to optical OC-N signals for transport through fiber optic media.

FIG. 1 (prior art) is a simplified block diagram illustrating various definitions of the transmission network that interconnect different kinds of SONET network elements. Specifically, the SONET line, section, and path definitions are illustrated. FIG. 1 further illustrates path terminating equipment 10a–b, line terminating equipment 11a–b, and section terminating equipment 12a–b. A network element is said to be "terminating" if during normal operation it may alter the information associated with the network section it terminates. For example, path terminating equipment 10a–b is defined to be equipment which is permitted to alter the path portion of a SONET frame; and an example of STS-1 path terminating equipment is an add/drop multiplexer. (An add/drop multiplexer is also line and section terminating equipment, because a device specified as capable of terminating one category of information necessarily can terminate subset categories.)

FIG. 2 is a schematic representation of a prior art UPS SONET ring 30, i.e., a SONET ring network in which a traffic stream 36 is split into two copies at network element 31 so that one copy travels in one direction in one medium 35a between network elements 31–34 along the ring, while a redundant copy is propagated in the opposite direction in another medium 35b, the traffic stream 36 shown being removed from the network element 33. Both rings 35a and 35b of the UPS SONET ring network traverse various network elements 31–34 positioned along the ring network. FIG. 2 in particular illustrates a traffic stream being added to the ring at network element 31, and the traffic stream being dropped (removed) from the ring at network element 33.

Each network element comprises network terminating equipment. Examples of network terminating equipment include traffic splitters and ring selectors. A traffic splitter 31a is shown included as part of network element 31. A ring selector 33a is shown included as part of network element 33.

A UPS SONET ring network, by transmitting the same information in opposite directions on two separate paths, provides each network element redundant information and thereby protects the information. If greater bandwidth is needed in an application, four-fiber bi-directional rings and optical upgrades, such as from OC3 to OC12, can be used but are expensive. Moreover, in some applications such as video or data broadcasting, it is not necessary or cost-effective to protect information.

What is needed is a way of making use of the bandwidth of a UPS SONET ring reserved for redundant information in applications where that redundancy is not needed or is not cost-effective.

SUMMARY OF THE INVENTION

The present invention is a method, for use in broadcast transmissions (point to multi-point), that converts some or all of the bandwidth of a classically protected uni-directional path-switched SONET ring network path to a single-thread (non-redundant) path with up to twice the bandwidth of the classical SONET ring network. The invention does not necessarily eliminate or change the architecture of a network providing a redundant ring, but is rather an overlay that can coexist with such an architecture.

According to the present invention, at a network element that is a source for transmitting information onto a UPS SONET ring network, non-redundant traffic is transmitted into the network on only one of the redundant paths within the ring. At the receiving network elements, this non-protected traffic is bridged such that it is both dropped at the network element and transmitted to the next down-stream network element. This leaves the path in the opposite direction available to carry an equal amount of non-redundant traffic.

Thus, in a UPS SONET ring network altered according to the present invention, both paths of the network transmit non-redundant information, thereby doubling the Path bandwidth by sacrificing protection. If the invention is applied to all paths within the network, the network is essentially converted into an unprotected linear configuration. However, the great utility of the invention is that both traffic classes, protected and unprotected, can be carried in the same network at the same time without extensive changes to existing equipment.

BRIEF DESCRIPTION OF THE DRAWINGS

The above and other features and advantages of the invention will become apparent from a consideration of the subsequent detailed description presented in connection with accompanying drawings, in which.

BEST MODE FOR CARRYING OUT THE INVENTION

Figure 1:
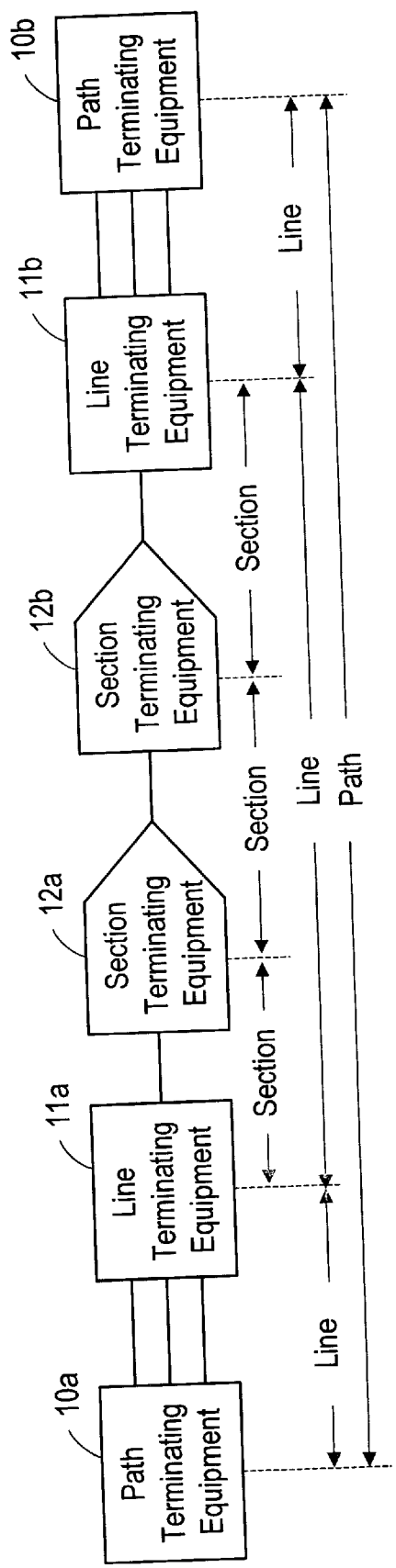
FIG. 1 is a block diagram illustrating various prior art SONET ring network elements.
Figure 2:
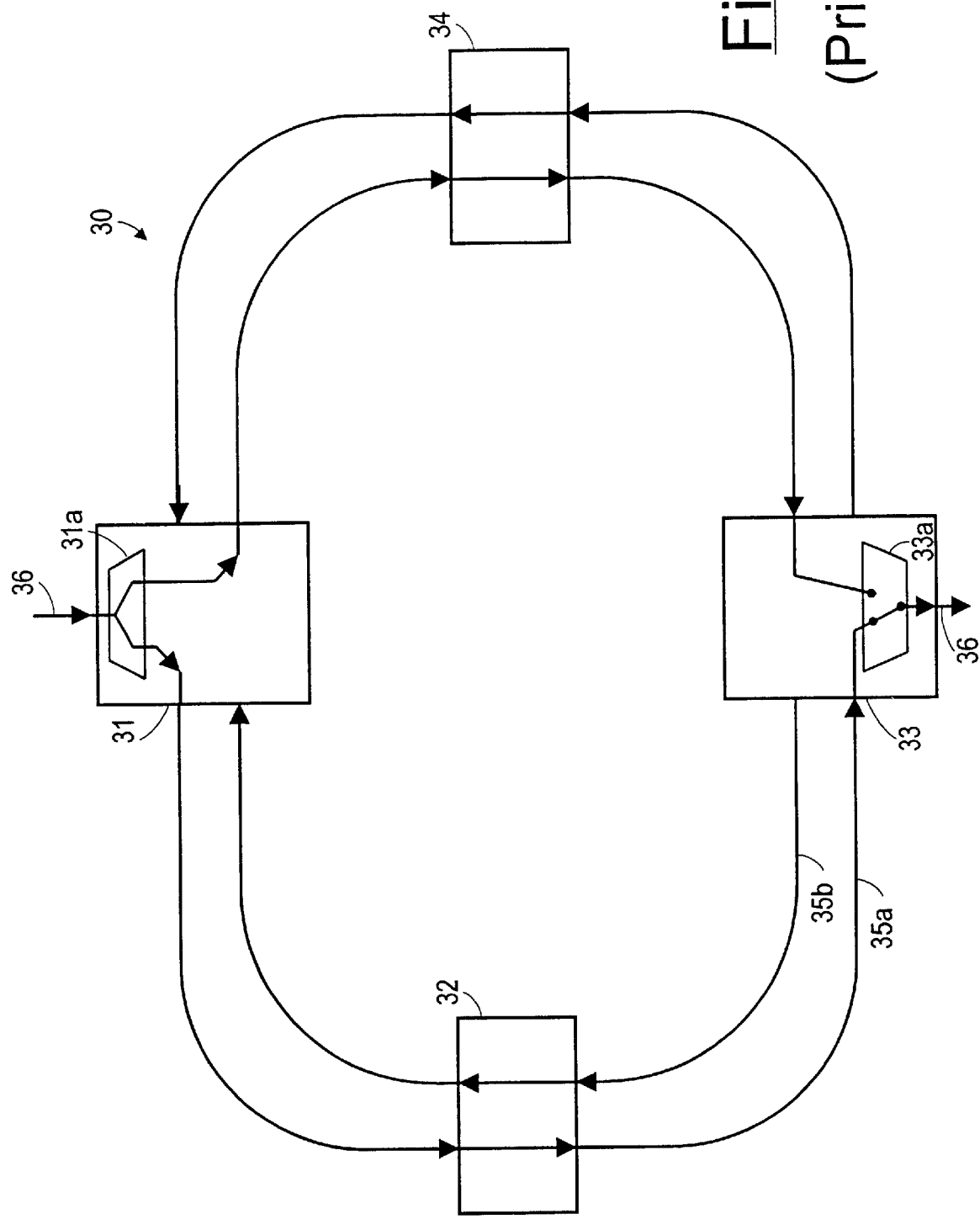
FIG. 2 is a schematic diagram of a prior art UPS SONET ring network.
Figure 3:
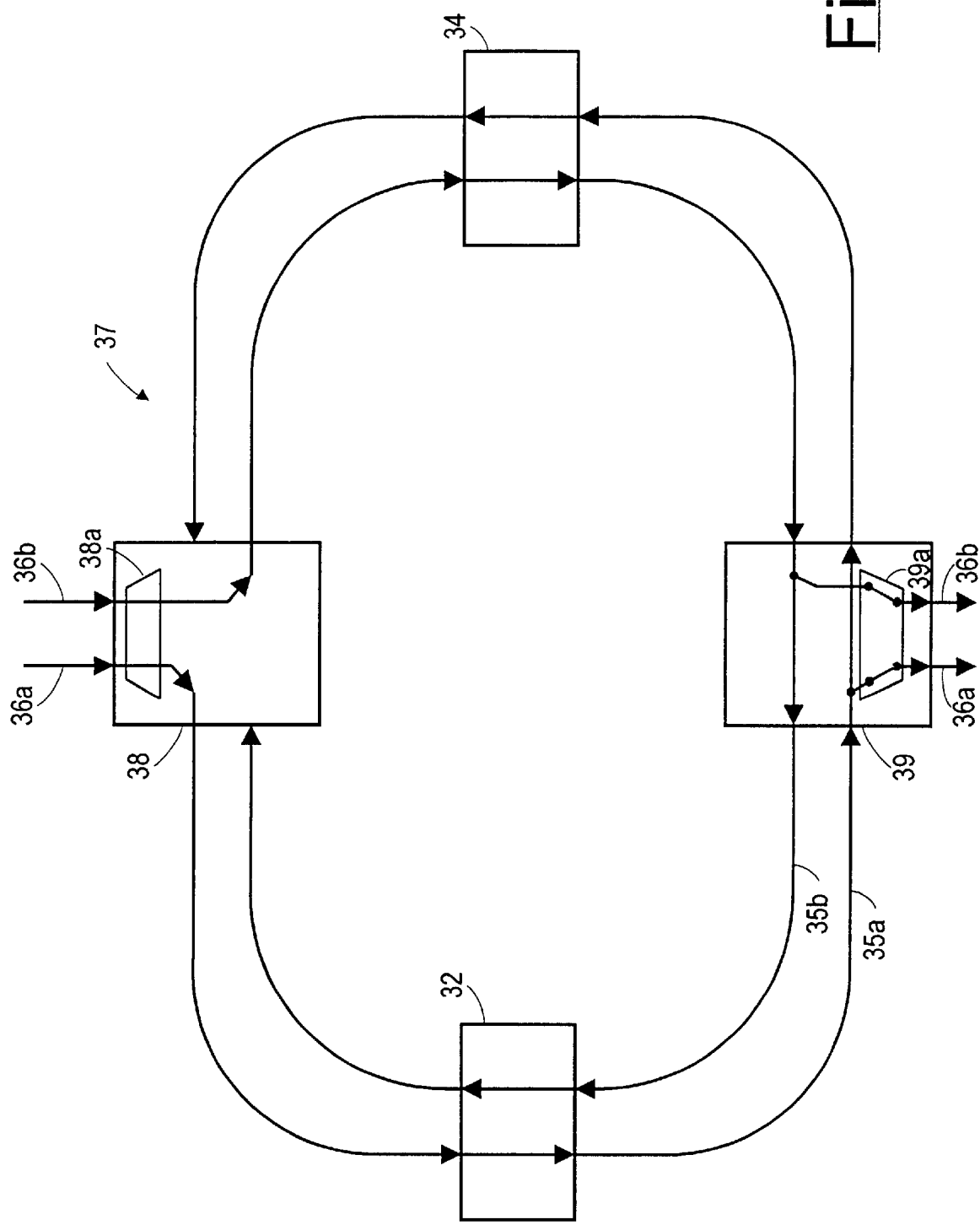
FIG. 3 is a schematic diagram of a UPS SONET ring altered according to the present invention.

Referring now to FIG. 3, to increase bandwidth in a UPS SONET ring network 37, a network element 38 from which information is broadcast to other network elements 32, 34, and 39, is modified to use both paths 35a and 35b for different traffic streams 36a and 36b. The modified network element 38 includes an altered traffic splitter 38a, configured, as shown, to allow adding traffic to both paths 35a and 35b.

Correspondingly, at least one network element 39 must be modified to receive the different traffic streams 36a and 36b, transmitted on paths 35*a* and 35*b*, respectively. For this, an altered ring selector 39*a* is used as part of the network element 39. The altered ring selector is configured, as shown, to allow dropping, at the same time, the different traffic streams 36*a* and 36*b*, each carried by a different path 35*a* and 35*b*.

In the preferred embodiment, the network elements that are modified to provide the increased bandwidth are add/drop multiplexers. Further, the two different traffic streams are transmitted in the same time division channel space, as provided by the STS protocol, but in opposite directions.

It is to be understood that the above-described arrangements are only illustrative of the application of the principles of the present invention. Numerous modifications and alternative arrangements may be devised by those skilled in the art without departing from the spirit and scope of the present invention, and the appended claims are intended to cover such modifications and arrangements.

What is claimed is:

1. A method for using more bandwidth in a uni-directional path switched SONET ring network having a plurality of nodes including in combination a plurality of network elements, the ring network having at least a first node from which information is to be added to the SONET ring network and a second node from which information is to be dropped from the SONET ring network, the ring network also having a first path for conveying a traffic stream to the plurality of network elements and a second path for transmitting to the plurality of network elements a redundant copy of the traffic stream on the first path, the method comprising the steps of:

i) modifying a first network element from among the plurality of network elements so that the first network element accepts a first and a second traffic stream, and provides the first traffic stream to the first path and the second traffic stream to the second path; and ii) modifying a second network element from among the plurality of network elements so that the second network element receives, at the same time, the first and second traffic streams, thereby allowing two different traffic streams to be output at the second network element at the same time.

2. A method as claimed in claim 1, wherein at least one network element from among the plurality of network elements serves as either a source or terminator for a path of the ring network and is an add/drop multiplexer.

3. A method as claimed in claim 1 wherein the first network element is modified by including an altered traffic splitter configured to provide a traffic stream to the first path and to the second path, and the second network element is modified to include an altered ring selector configured to be responsive to the first path and to the second path.

4. A method as claimed in claim 1, wherein the first traffic stream and the second traffic stream are transmitted in a same time division channel space, but in opposite directions.

* * * * *